UNITED STATES PATENT OFFICE.

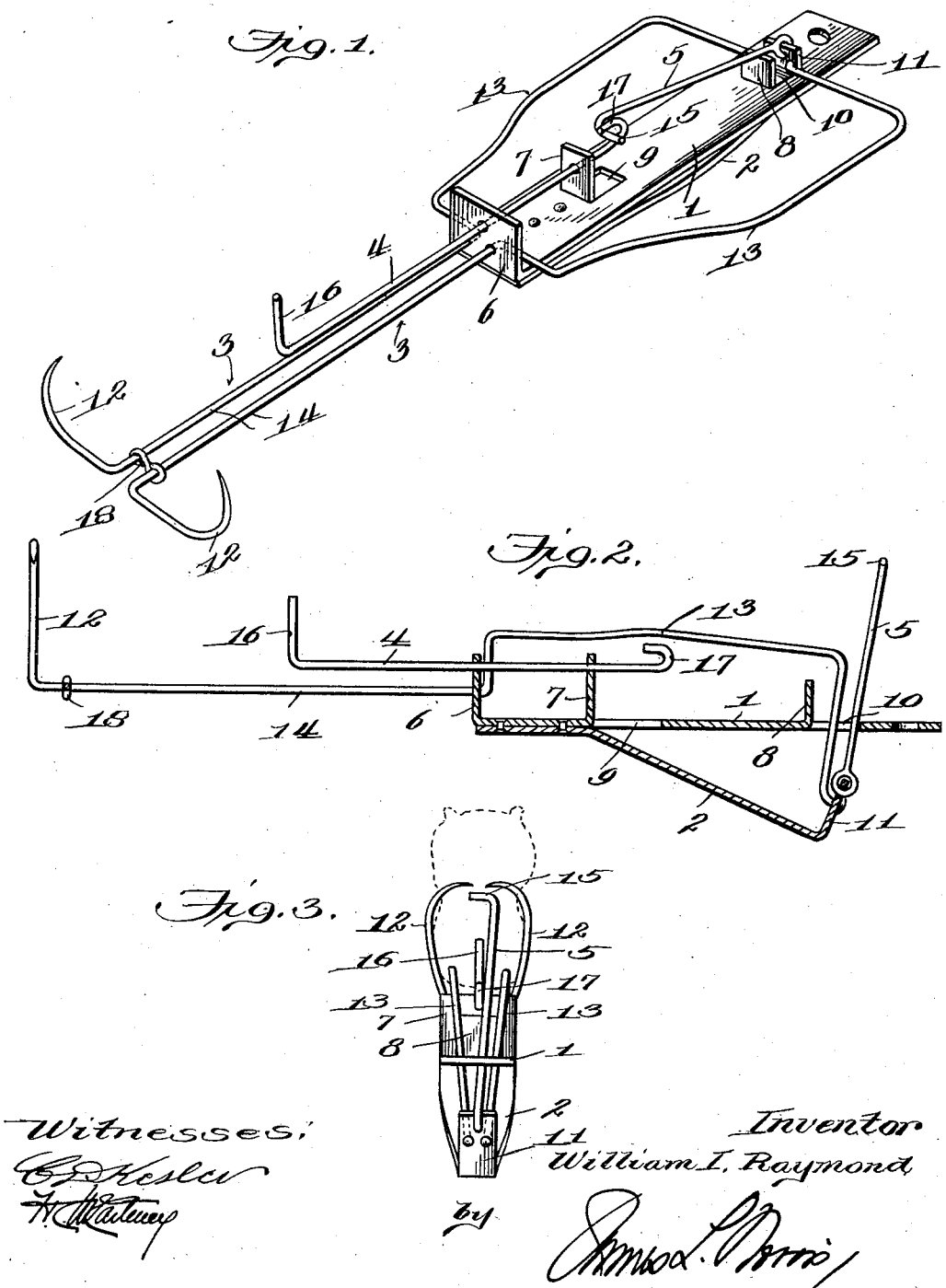

WILLIAM I. RAYMOND, OF FOREST GROVE, OREGON.

ANIMAL-TRAP.

1,082,649.

Specification of Letters Patent.

Patented Dec. 30, 1913.

Application filed February 8, 1913. Serial No. 747,123.

*To all whom it may concern:*

Be it known that I, WILLIAM I. RAYMOND, a citizen of the United States, residing at Forest Grove, in the county of Washington and State of Oregon, have invented new and useful Improvements in Animal-Traps, of which the following is a specification.

The present invention has reference to traps for catching moles, gophers and other burrowing animals, and it proposes, briefly, an extremely simple and effective device of the general type indicated having certain hereinafter described improvements in or relating to the construction and mounting of its jaws and of the actuating spring therefor, whereby it may be set and introduced into a hole or burrow and its jaws then adjusted in conformity with the size of such hole or burrow. In this way, the use of the trap is rendered in no wise dependent upon the size of the hole or burrow, nor is it ordinarily necessary to enlarge the mouth thereof in order to permit the introduction of the set trap.

An embodiment of the invention is illustrated in the accompanying drawing, whereof:—

Figure 1 is a perspective view of the trap, showing the position of the parts when set; Fig. 2 is a longitudinal sectional view, showing the trap spring; and Fig. 3 is an end view of Fig. 2.

As shown in said drawing, the improved trap consists primarily of five parts, namely; the base 1, spring 2, jaws 3, trigger 4 and detent 5. The base 1 may have any desired shape, but is preferably in the form of a flat metal plate which is provided with upstanding front, intermediate and rear tongues 6, 7 and 8. The first of these tongues is produced by bending the front end of the plate upward, while the other two tongues are produced by forming axially alining slits in the plate and bending upward the parts defined by said slits, thus leaving the open spaces 9 and 10. The spring 2 is also preferably constituted by a flat strip of steel of substantially the same width as the base plate, which is riveted to the under side of the latter at its front end and provided at its free, rear end with an up-bent finger 11, that is designed to project through opening 10 when the trap is set, as hereinafter explained.

The two jaws 3 are each constructed from a single wire rod which is so bent as to form an impaling hook 12, or jaw proper, at its front end, a wing-like rear portion 13 and a straight connecting portion 14, the corresponding portions of the two rods being reversely arranged, as will be understood. The terminal parts of the wings 12 are bent laterally inward toward the base plate 1, and are pivotally engaged and supported in pairs of perforations provided in the tongue 6 and finger 11, whereby said wings are enabled to rock toward and from each other, with a corresponding resultant movement of the impaling hooks 12. This movement, as will be understood, is effected through the agency of the spring 2, which latter occupies the position depicted in Fig. 1 when the trap is set, and automatically assumes its normal position, (shown in Fig. 2) when the trap is sprung, its movement from one position to the other tending to draw the rear terminals of the wings through opening 10 and thus force the jaws to rock or swing bodily toward each other, during which movement of said terminals, the wings bend, as will be understood. Subsequent re-setting of the trap, produced by moving the spring upwardly against the under face of the base plate, serves to allow the jaws to be rocked away from each other.

To retain the jaws in set or expanded position, the trigger 4 and detent 5 are provided. The detent is preferably in the form of a swinging wire rod, which is pivoted at its rear end to finger 11 and provided at its front end with a hook 15. The trigger, which is also in the form of a wire rod, is movable endwise through perforations in the tongues 6 and 7 and terminates at its front end in an upstanding finger 16, and at its rear end in a hook 17 engageable by the detent hook 15. In order to prevent spreading of the connecting portions 14 of the jaws, a 8-shaped link 18 or analogous device may be provided.

In operation the trap is set by moving the spring upwardly against the base plate in the manner previously described, and then engaging the hook end 15 of the detent with the hook end 17 of the trigger. The trap may then be inserted into the hole or other burrow, with the impaling end first, after which the wings 13 may be moved away from each other to conform to the size of the burrow. It will thus be apparent that there is no restriction of the trap to burrows of a definite size, as the rocking mounting of the wings enables the trap to be adjusted in conformity with practically all burrows; for the same reason there is no necessity for enlarging the mouth of the burrow as is common with many traps now in general use.

I claim:—

1. In an animal trap, the combination of a base; an operating leaf spring connected at its front end to said base; a pair of coöperative jaws each embodying a wing connected at its front end with the front end of said base and at its rear end with the rear end of said spring, an impaling member, and a connecting portion between said wing and member; and means for holding said jaws in set position.

2. In an animal trap, the combination, with a base provided with an opening and a perforated projection in advance thereof, and an operating spring having a perforated finger disposed beneath said opening and adapted to extend therethrough when the trap is set; of a pair of coöperative rocking jaws pivotally mounted in the perforations in said projection and finger; a trigger slidably connected with said base; and a detent pivoted to said finger and adapted to engage said trigger for holding said jaws in set position.

3. In an animal trap, the combination, with a base provided with an opening and a perforated projection in advance thereof, and an operating spring connected to the under side of said base and having a perforated finger disposed beneath said opening and adapted to extend therethrough when the trap is set; of a pair of coöperative rocking jaws each embodying a wing pivotally engaged at opposite ends in the perforations in said projection and finger, an impaling member, and a connecting portion between said wing and member; a trigger slidably connected with said projection; and a detent pivoted to said finger and adapted to engage said finger for holding said jaws in set position.

4. In an animal trap, the combination with a base provided with an opening and a perforated projection in advance thereof, and an operating spring connected to the under side of said base and having a perforated finger disposed beneath said opening and adapted to extend therethrough when the trap is set; of a pair of coöperative rocking jaws pivotally mounted in the perforations in said projection and finger; an endwise movable trigger connected with said projection and having a hooked rear terminal; and a detent pivoted at one end to said finger and having its free end hooked for engagement with the trigger hook to hold said jaws in set position.

In testimony whereof I have hereunto set my hand in presence of two subscribing witnesses.

WILLIAM I. RAYMOND.

Witnesses:
 AMOS LAHAIE,
 GEORGE SCHNEIDER.

---

Copies of this patent may be obtained for five cents each, by addressing the "Commissioner of Patents, Washington, D. C."